United States Patent
Chen

(10) Patent No.: US 10,571,725 B2
(45) Date of Patent: Feb. 25, 2020

(54) METHOD FOR LOCATING SUBPIXEL ADDRESS, ADDRESS LOCATION DEVICE AND REPAIRING DEVICE

(71) Applicant: BOE TECHNOLOGY GROUP CO., LTD., Beijing (CN)

(72) Inventor: Yi Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 15/571,253

(22) PCT Filed: Mar. 28, 2017

(86) PCT No.: PCT/CN2017/078418
§ 371 (c)(1),
(2) Date: Nov. 1, 2017

(87) PCT Pub. No.: WO2017/197984
PCT Pub. Date: Nov. 23, 2017

(65) Prior Publication Data
US 2018/0224679 A1    Aug. 9, 2018

(30) Foreign Application Priority Data
May 16, 2016    (CN) .......................... 2016 1 0322619

(51) Int. Cl.
*G02F 1/13*      (2006.01)
*G09G 3/00*      (2006.01)
(Continued)

(52) U.S. Cl.
CPC .......... *G02F 1/1309* (2013.01); *G02F 1/1362* (2013.01); *G02F 1/136259* (2013.01);
(Continued)

(58) Field of Classification Search
CPC ................ G02F 1/1309; G02F 1/1362; G02F 1/136259; G02F 2001/134345;
(Continued)

(56) References Cited

U.S. PATENT DOCUMENTS

| | | | |
|---|---|---|---|
| 7,265,876 B2 | 9/2007 | Huang et al. | |
| 2002/0122123 A1* | 9/2002 | Kimura | H04N 9/30 |
| | | | 348/246 |

(Continued)

FOREIGN PATENT DOCUMENTS

| CN | 1637834 A | 7/2005 |
|---|---|---|
| CN | 101339736 A | 1/2009 |

(Continued)

OTHER PUBLICATIONS

First Chinese Office Action, for Chinese Patent Application No. 201610322619.3, dated Dec. 12, 2016, 15 pages.
(Continued)

*Primary Examiner* — Charles S Chang
(74) *Attorney, Agent, or Firm* — Kinney & Lange, P.A.

(57) ABSTRACT

The present disclosure provides a method for locating sub-pixel address, an address location device and a repairing device. The method includes: obtaining an address of a location sub-pixel which is located by a cursor of the address location device in a liquid crystal panel; and calculating an address of a target sub-pixel in one pixel to which the location sub-pixel belongs, by using a sub-pixel arrangement structure of the one pixel of the liquid crystal panel as well as the address of the location sub-pixel. The target sub-pixel is one sub-pixel which is unable to be located by the cursor.

19 Claims, 6 Drawing Sheets obtaining an address of a location sub-pixel which is located by a cursor of the address location device in a liquid crystal panel — 101 calculating an address of a target sub-pixel in one pixel to which the location sub-pixel belongs, by using a sub-pixel arrangement structure of the one pixel of the liquid crystal panel as well as the address of the location sub-pixel — 102

(51) Int. Cl.
*G02F 1/1362* (2006.01)
*G06F 3/0481* (2013.01)
*G09G 3/36* (2006.01)
*G02F 1/1343* (2006.01)

(52) U.S. Cl.
CPC ......... *G06F 3/04812* (2013.01); *G09G 3/006* (2013.01); *G02F 2001/134345* (2013.01); *G09G 3/3607* (2013.01); *G09G 2300/0452* (2013.01)

(58) Field of Classification Search
CPC .. G06F 3/04812; G09G 3/006; G09G 3/3607; G09G 2300/0452
USPC .......................................................... 349/192
See application file for complete search history.

(56) References Cited

U.S. PATENT DOCUMENTS

| | | | |
|---|---|---|---|
| 2003/0210409 A1 | 11/2003 | Huang et al. | |
| 2005/0140622 A1 | 6/2005 | Lee et al. | |
| 2006/0262053 A1 | 11/2006 | Lee et al. | |
| 2008/0117231 A1* | 5/2008 | Kimpe | G09G 3/20 345/629 |
| 2011/0049374 A1* | 3/2011 | Omi | G09G 3/006 250/370.08 |
| 2013/0229550 A1* | 9/2013 | Nakao | H04N 5/367 348/247 |
| 2016/0210526 A1* | 7/2016 | Lee | G06T 7/001 |
| 2016/0351100 A1 | 12/2016 | Meng et al. | |

FOREIGN PATENT DOCUMENTS

| | | |
|---|---|---|
| CN | 103177173 A | 6/2013 |
| CN | 203490439 U | 3/2014 |
| CN | 103698912 A | 4/2014 |
| CN | 104851410 A | 8/2015 |
| CN | 105788552 A | 7/2016 |
| TW | M342516 U | 10/2008 |

OTHER PUBLICATIONS

Second Chinese Office Action, for Chinese Patent Application No. 201610322619.3, dated Mar. 14, 2017, 10 pages.
International Search Report & Written Opinion, for PCT Patent Application No. PCT/CN2017/078418, dated Jul. 3, 2017, 14 pages.

* cited by examiner

METHOD FOR LOCATING SUBPIXEL ADDRESS, ADDRESS LOCATION DEVICE AND REPAIRING DEVICE

CROSS-REFERENCE TO RELATED APPLICATION

This application is the U.S. national phase of PCT Application No. PCT/CN2017/078418 filed on Mar. 28, 2017, which claims the priority of the Chinese patent application No. 201610322619.3 filed on May 16, 2016, which is incorporated herein by reference in its entirety.

TECHNICAL FIELD

The present disclosure relates to the field of liquid crystal display technology, and in particular to a method for locating sub-pixel address, an address location device and a repairing device.

BACKGROUND

With development of the liquid crystal display technology, pixel structures of in current liquid crystal panels have been improved greatly. For example, one pixel in a typical liquid crystal panel only includes three sub-pixels such as a red (R) sub-pixel, a green (G) sub-pixel and a blue (B) sub-pixel, and one pixel in a current liquid crystal panel may further include sub-pixels of other colors in addition to the typical RGB sub-pixels. For example, one pixel may include four sub-pixels such as a red sub-pixel, a green sub-pixel, a blue sub-pixel and a white (W) sub-pixel; or, one pixel may include four sub-pixels such as a red sub-pixel, a green sub-pixel, a blue sub-pixel and a yellow (Y) sub-pixel. In the process of manufacture or utilization of the liquid crystal panel, it is usually needed to locate addresses of sub-pixels of the liquid crystal panel by means of using an address location device to locate addresses of sub-pixels of the liquid crystal panel. However, due to technical limitations of the current address location device, a cursor of the current address location device only can locate addresses of the three sub-pixels including the red pixel, the green pixel and the blue pixel of the pixel, and cannot locate addresses of other six-pixels of the pixel, for example, cannot locate addresses of the W sub-pixel and the Y sub-pixel. Thus, the current address location device cannot obtain addresses of sub-pixels which are unable to be located by the cursor in the liquid crystal panel.

SUMMARY

An object of the present disclosure is to provide a method for locating sub-pixel address, an address location device and a repairing device, which can solve the problems in the related art that the current address location device cannot obtain addresses of sub-pixels which are unable to be located by the cursor in the liquid crystal panel.

In order to achieve the above object, the present disclosure provides a method for locating sub-pixel address, applied to an address location device, which includes:

obtaining an address of a location sub-pixel which is located by a cursor of the address location device in a liquid crystal panel; and calculating an address of a target sub-pixel in one pixel to which the location sub-pixel belongs, by using a sub-pixel arrangement structure of the one pixel of the liquid crystal panel as well as the address of the location sub-pixel; wherein the target sub-pixel is one sub-pixel which is unable to be located by the cursor.

Optionally, the calculating an address of a target sub-pixel in one pixel to which the location sub-pixel belongs, by using a sub-pixel arrangement structure of the one pixel of the liquid crystal panel as well as the address of the location sub-pixel, includes:

determining an address of the one pixel to which the location sub-pixel belongs, by using the sub-pixel arrangement structure of the one pixel of the liquid crystal panel as well as the address of the location sub-pixel, and finding the address of the target sub-pixel in the address of the one pixel according to the sub-pixel arrangement structure, or calculating a position relationship between the location sub-pixel and the target sub-pixel in the one pixel to which the location sub-pixel belongs by using the sub-pixel arrangement structure of the one pixel of the liquid crystal panel, and determining the address of the target sub-pixel by using the position relationship and the address of the location sub-pixel.

Optionally, the calculating an address of a target sub-pixel in one pixel to which the location sub-pixel belongs, by using a sub-pixel arrangement structure of the one pixel of the liquid crystal panel as well as the address of the location sub-pixel, includes:

when the address location device meets a preset condition, calculating the address of the target sub-pixel in the one pixel to which the location sub-pixel belongs, by using the sub-pixel arrangement structure of the pixel of the liquid crystal panel as well as the address of the location sub-pixel, wherein the preset condition is a condition for obtaining one sub-pixel which is unable to be located by the cursor, the method further includes:

taking the target sub-pixel as one sub-pixel to be located currently by the address location device, and outputting the address of the target sub-pixel.

Optionally, the address location device is provided with a first button and a second button, and the obtaining an address of a location sub-pixel which is located by a cursor of the address location device in a liquid crystal panel includes:

when receiving a first operation command input through the first button, obtaining the address of the location sub-pixel which is located by the cursor of the address location device in the liquid crystal panel, wherein the preset condition includes receiving a second operation command input through the second button, when the address location device meets the preset condition, the calculating the address of the target sub-pixel in the one pixel to which the location sub-pixel belongs, by using the sub-pixel arrangement structure of the pixel of the liquid crystal panel as well as the address of the location sub-pixel, includes:

when receiving the second operation command input through the second button, calculating the address of the target sub-pixel in the one pixel to which the location sub-pixel belongs, by using the sub-pixel arrangement structure of the one pixel of the liquid crystal panel as well as the address of the location sub-pixel.

Optionally, the address location device is provided with a first button, and the obtaining an address of a location sub-pixel which is located by a cursor of the address location device in a liquid crystal panel includes: when receiving a first operation command input through the first button, obtaining the address of the location sub-pixel which is located by the cursor of the address location device in the liquid crystal panel, wherein the preset condition includes that, a first operation command input through the first button is received again in a first time period after receiving the first operation command, or that the first operation command is a command input by long pressing the first button, when the address location device meets the preset condition, the calculating the address of the target sub-pixel in the one pixel to which the location sub-pixel belongs, by using the sub-pixel arrangement structure of the pixel of the liquid crystal panel as well as the address of the location sub-pixel, includes: when the first operation command input through the first button is received again in the first time period after receiving the first operation command, calculating the address of the target sub-pixel in the one pixel to which the location sub-pixel belongs, by using the sub-pixel arrangement structure of the one pixel of the liquid crystal panel as well as the address of the location sub-pixel;

when the first operation command is the command input by long pressing the first button, calculating the address of the target sub-pixel in the one pixel to which the location sub-pixel belongs, by using the sub-pixel arrangement structure of the one pixel of the liquid crystal panel as well as the address of the location sub-pixel, wherein the long pressing means that the first button is pressed for a time duration which exceeds a second time period.

Optionally, the target sub-pixel is a defective sub-pixel; and/or, the target sub-pixel is a white sub-pixel or a yellow sub-pixel.

The present disclosure provides an address location device which includes:

an obtaining circuit configured to obtain an address of a location sub-pixel which is located by a cursor of the address location device in a liquid crystal panel; and a calculation circuit configured to calculate an address of a target sub-pixel in one pixel to which the location sub-pixel belongs, by using a sub-pixel arrangement structure of the one pixel of the liquid crystal panel as well as the address of the location sub-pixel, wherein the target sub-pixel is one sub-pixel which is unable to be located by the cursor.

Optionally, the calculation circuit is further configured to determine an address of the one pixel to which the location sub-pixel belongs, by using the sub-pixel arrangement structure of the one pixel of the liquid crystal panel as well as the address of the location sub-pixel, and find the address of the target sub-pixel in the address of the one pixel according to the sub-pixel arrangement structure, or, the calculation circuit is further configured to calculate a position relationship between the location sub-pixel and the target sub-pixel in the one pixel to which the location sub-pixel belongs by using the sub-pixel arrangement structure of the one pixel of the liquid crystal panel, and determine the address of the target sub-pixel by using the position relationship and the address of the location sub-pixel.

Optionally, the calculation circuit is further configured to, when the address location device meets a preset condition, calculate the address of the target sub-pixel in the one pixel to which the location sub-pixel belongs, by using the sub-pixel arrangement structure of the one pixel of the liquid crystal panel as well as the address of the location sub-pixel, wherein the preset condition is a condition for obtaining one sub-pixel which is unable to be located by the cursor, wherein the device further includes: a location circuit configured to take the target sub-pixel as one sub-pixel to be located currently by the address location device, and output the address of the target sub-pixel.

Optionally, the address location device is provided with a first button and a second button, the obtaining circuit is configured to, when receiving a first operation command input through the first button, obtain the address of the location sub-pixel which is located by the cursor of the address location device in the liquid crystal panel, the calculation circuit is configured to, when receiving a second operation command input through the second button, calculate the address of the target sub-pixel in the one pixel to which the location sub-pixel belongs, by using the sub-pixel arrangement structure of the one pixel of the liquid crystal panel as well as the address of the location sub-pixel.

Optionally, the address location device is provided with a first button, the obtaining circuit is configured to, when receiving a first operation command input through the first button, obtain the address of the location sub-pixel which is located by the cursor of the address location device in the liquid crystal panel, the calculation circuit is further configured to, when the first operation command input through the first button is received again in a first time period after receiving the first operation command, calculate the address of the target sub-pixel in the one pixel to which the location sub-pixel belongs, by using the sub-pixel arrangement structure of the one pixel of the liquid crystal panel as well as the address of the location sub-pixel; or, the calculation circuit is further configured to, when the first operation command is a command input by long pressing the first button, calculate the address of the target sub-pixel in the one pixel to which the location sub-pixel belongs, by using the sub-pixel arrangement structure of the one pixel of the liquid crystal panel as well as the address of the location sub-pixel, wherein the long pressing means that the first button is pressed for a time duration which exceeds the first time period.

Optionally, the target sub-pixel is a defective sub-pixel; and/or, the target sub-pixel is a white sub-pixel or a yellow sub-pixel.

The present disclosure provides a repairing device including the above address location device.

According to embodiments of the present disclosure, an address of one sub-pixel which is unable to be located by the cursor in the liquid crystal panel can be obtained by obtaining an address of a location sub-pixel which is located by a cursor of the address location device in a liquid crystal panel, and calculating an address of a target sub-pixel in one pixel to which the location sub-pixel belongs, by using a sub-pixel arrangement structure of the one pixel of the liquid crystal panel as well as the address of the location sub-pixel. The target sub-pixel is one sub-pixel which is unable to be located by the cursor.

DETAILED DESCRIPTION OF THE EMBODIMENTS

In order to make the technical problem to be solved, the technical solutions and the advantages of the present disclosure more apparent, the present disclosure will be described hereinafter in a clear and complete manner in conjunction with the drawings and embodiments.

One embodiment of the present disclosure may be applied to some scenarios such as manufacturing of liquid crystal panels, debugging, testing or repairing, which needs to locate sub-pixels in one liquid crystal panel. In these scenarios, an address location device may be connected with the liquid crystal panel, and locates sub-pixels in the liquid crystal panel by means of connection between the address location device and the liquid crystal panel. The address location device may be an address locator, the above liquid crystal panel may be one liquid crystal panel without a signal generation device being mounted, and the liquid crystal panel receives signal from a signal generation device which is mounted to the same equipment as the address locator so as to display pictures. For example, the address locator and the signal generation device are mounted to a quality inspection device, a debugging device or a repairing device in a production line. Of course, in some scenarios, the address locator and the signal generation device may be mounted to different devices, which are not limited in this embodiment. In addition, in some scenarios, the above liquid crystal panel may be one liquid crystal panel including a signal generation device.

In addition, the size of the liquid crystal panel is not limited in one embodiment of the present disclosure, for example, the liquid crystal panel may be a small sized liquid crystal panel with a size within 34 inches, or a large sized liquid crystal panel with a size greater than 34 inches. In addition, the above liquid crystal panel may be an active-matrix organic light emitting diode panel including RGBW sub-pixels or liquid crystal panel of other form. Implementation of a method for locating sub-pixel address according to an embodiment of the present disclosure is described hereinafter.

Figure 1:
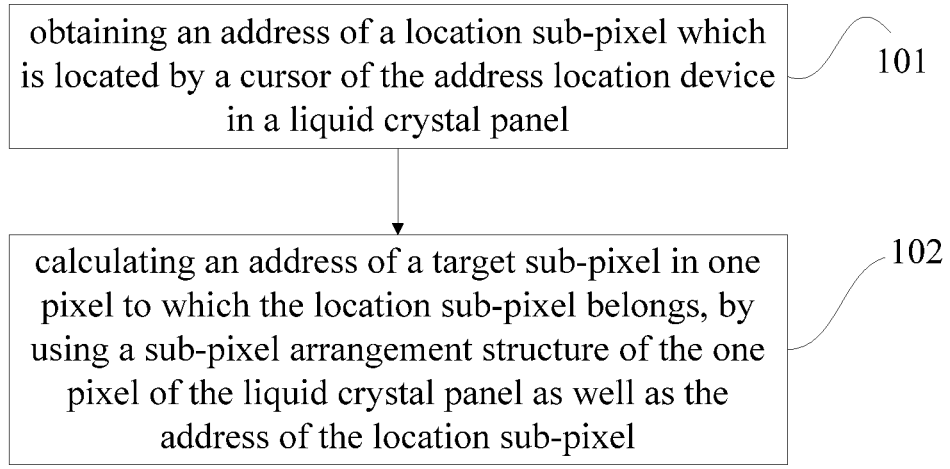
FIG. 1 is a flow chart of a method for locating sub-pixel address according to an embodiment of the present disclosure.

FIG. 1 is a flow chart of a method for locating sub-pixel address according to an embodiment of the present disclosure. Referring to FIG. 1, this method may be applied to an address location device and includes the following steps.

Step 101 is to obtain an address of a location sub-pixel which is located by a cursor of the address location device in a liquid crystal panel.

Step 102 is to calculate an address of a target sub-pixel in one pixel which the location sub-pixel belongs to, by using a sub-pixel arrangement structure of the pixel of the liquid crystal panel as well as the address of the location sub-pixel, where the target sub-pixel is one sub-pixel which is unable to be located by the cursor.

Figure 2:
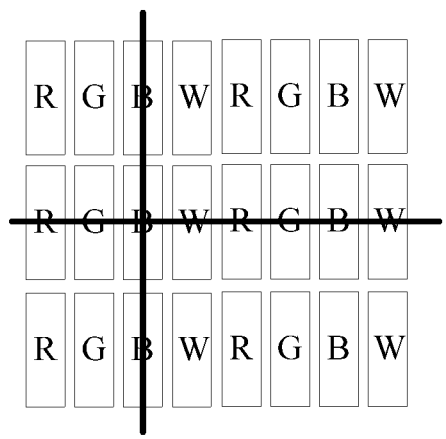
FIG. 2 is a schematic diagram showing location of a sub-pixel according to an embodiment of the present disclosure.

In one embodiment, the above location sub-pixel which is located by the cursor of the address location device in the liquid crystal panel may be understood as that the above location sub-pixel refers to one sub-pixel where the cursor of the above address location device is placed. For example, as shown in FIG. 2, the cursor is placed at a B sub-pixel in a third column in a second row, and then the B sub-pixel is the above location sub-pixel. Further, the above location sub-pixel may be a R sub-pixel, a G sub-pixel or a B sub-pixel. The above target sub-pixel may be a W sub-pixel, or a Y sub-pixel, or other sub-pixels rather than the RGB sub-pixels, which is not limited in this embodiment. Further, the above described sub-pixel which is unable to be located by the cursor may be understood as that the cursor is unable to be moved to the above target sub-pixel.

Figure 3A:
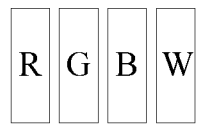
FIG. 3a and FIG. 3b are schematic diagrams showing arrangements of sub-pixels according to an embodiment of the present disclosure.
Figure 3B:
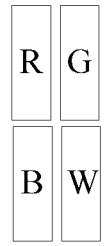

Further, the above sub-pixel arrangement structure of the pixel of the liquid crystal panel may be understood as an arrangement structure of various sub-pixels in the pixel. For example, as shown in FIG. 3a, the R sub-pixel, the G sub-pixel, the B sub-pixel and the W sub-pixel may be juxtaposed in an identical row; or, as shown in FIG. 3b, the R sub-pixel and the G sub-pixel may be juxtaposed in one row while the B sub-pixel and the W sub-pixel may be juxtaposed in another row. The above sub-pixel arrangement structure may be obtained in advance by the address location device. For example, the address location device receives in advance the sub-pixel arrangement structure which is input by a user or sent from other device.

The above address of the location sub-pixel may be an address in a coordinate system of the address location device, or an address in a coordinate system of the liquid crystal panel, which is not limited.

By the above sub-pixel arrangement structure, positions of various sub-pixels of the pixel in the pixel can be determined. Thus, when an address of one sub-pixel of the pixel is known, then addresses of other sub-pixels can also be determined. For example, as shown in FIG. 3a, the above location sub-pixel is the R sub-pixel and an address of the R sub-pixel is the fifth column in the second row, then addresses of the G sub-pixel, the B sub-pixel and the W sub-pixel can be determined as the sixth column in the second row, the seventh column in the second row, and the eighth column in the second row, respectively.

Through the above steps, according to the address of the sub-pixel which is located by the cursor of the address location device, it is able to obtain addresses of sub-pixels which are in the same pixel as the above sub-pixel and are unable to be located by the cursor.

In one embodiment, an address of a target pixel to which the target sub-pixel belongs, may be obtained. When the address location device meets a preset condition, the W sub-pixel in the target pixel may be taken as the W sub-pixel to be located currently by the address location device, and then an address of the W sub-pixel can be calculated according to the address of the target pixel, thereby locating the address of the W sub-pixel in the liquid crystal panel.

Figure 4:
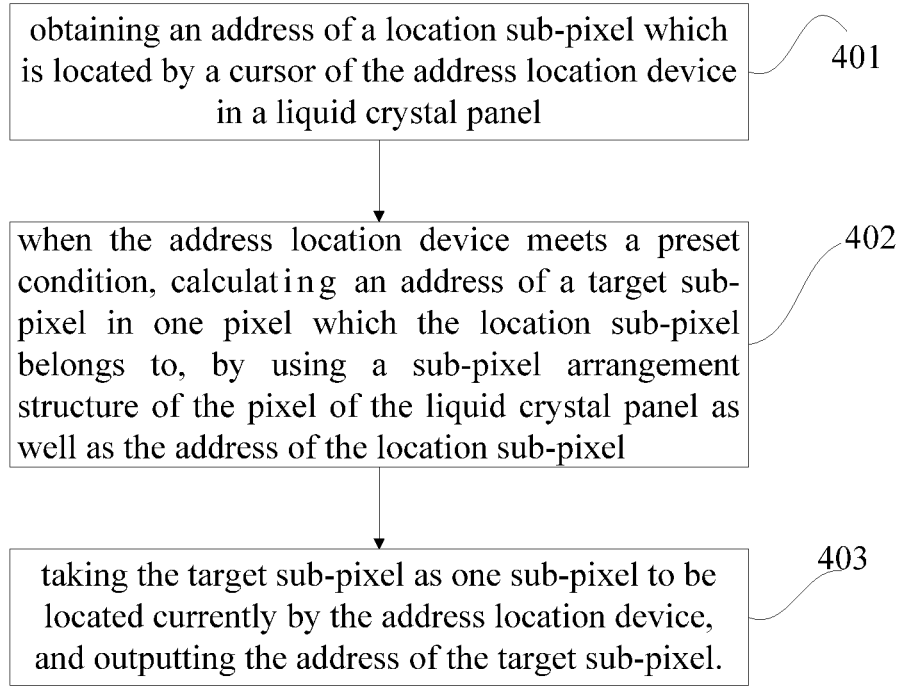
FIG. 4 is a flow chart of a method for locating sub-pixel address according to another embodiment of the present disclosure.

FIG. 4 is a flow chart of a method for locating sub-pixel address according to another embodiment of the present disclosure. Referring to FIG. 4, this method may be applied to an address location device and includes the following steps.

Step 401 is to obtain an address of a location sub-pixel which is located by a cursor of the address location device in a liquid crystal panel.

Step 402 is to, when the address location device meets a preset condition, calculate an address of a target sub-pixel in one pixel which the location sub-pixel belongs to, by using a sub-pixel arrangement structure of the pixel of the liquid crystal panel as well as the address of the location sub-pixel, where the target sub-pixel is one sub-pixel which is unable to be located by the cursor.

Step 403 is to take the target sub-pixel as one sub-pixel to be located currently by the address location device, and output the address of the target sub-pixel.

It should be noted that the step 402 and the step 403 are optional or replaceable. The step 402 may be understood as a further limitation to the step 102 in the embodiment shown in FIG. 1. The step 403 may be understood as a step added to the embodiment shown in FIG. 1. In other words, the step 402 and the step 403 can be replaced with the step 102.

In one embodiment, the above preset condition may be conditions preset by the user in advance for obtaining the sub-pixel which is unable to be located by the cursor of the address location device, for example, the address location device receives a specific operation command or the cursor of the address location device is placed at a specific position, or the like, which is not limited in this embodiment.

The above taking the target sub-pixel as one sub-pixel to be located currently by the address location device may be understood as taking the above target sub-pixel as one sub-pixel to be currently output by the address location device, in order words, the address location device needs to output the address of the above target sub-pixel. Of course, the term output herein may refer to displaying the address of the above target sub-pixel, or, sending the address of the above target sub-pixel to other device, or broadcasting the address of the above target sub-pixel via voice, or the like. Of course, in one embodiment, the address of the above target sub-pixel may be recorded.

In one embodiment, the above address location device may be provided with a first button and a second button. The step of obtaining the address of the location sub-pixel which is located by the cursor of the address location device in the liquid crystal panel includes: when receiving a first operation command input through the first button, obtaining the address of the location sub-pixel which is located by the cursor of the address location device in the liquid crystal panel.

The step 402 may include: when receiving a second operation command input through the second button, calculating the address of the target sub-pixel in one pixel which the location sub-pixel belongs to, by using the sub-pixel arrangement structure of the pixel of the liquid crystal panel as well as the address of the location sub-pixel.

Figure 5:
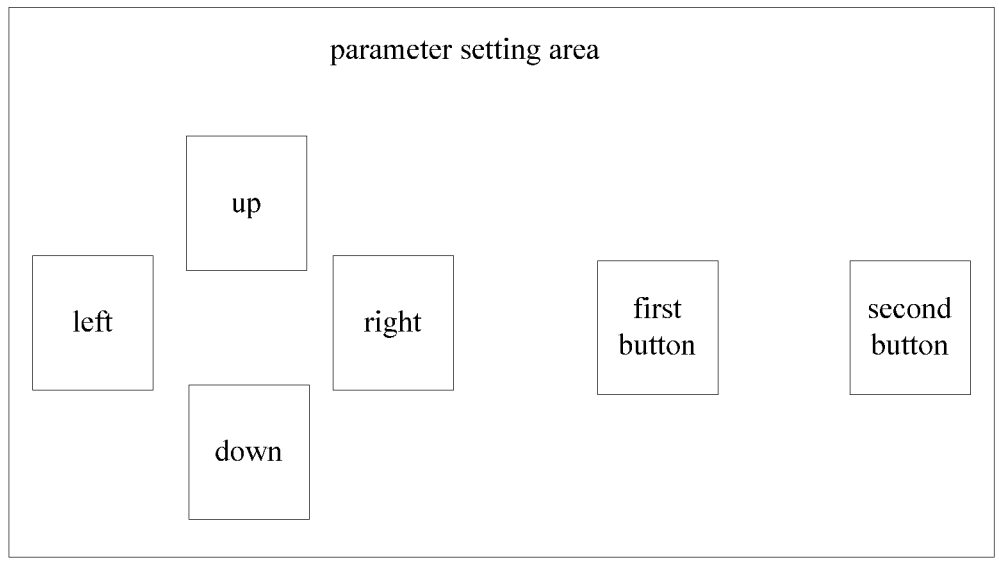
FIG. 5 is a schematic diagram showing an interface of a parameter setting area according to an embodiment of the present disclosure.

In other words, the above preset condition may include receiving the second operation command input through the second button. The above second button may be a second button provided at the above address location device. For example, as shown in FIG. 5, the address location device includes an interface of a parameter setting area, and movement of the cursor may be controlled by up, down, left and right buttons in the interface shown in FIG. 5. Of course, herein, the various buttons in the interface shown in FIG. 5 may be physical buttons or virtual buttons, which is not specifically limited. Further, the above second operation command may be a command input by the user through operating the above second button, for example, a command input by the user through clicking on or pressing the second button.

In one embodiment, the first button may be pressed to determine the address of the above location sub-pixel, and the second button may be pressed to automatically identify the above target sub-pixel as one sub-pixel to be located currently by the address location device, and calculate the address of the above target sub-pixel.

In one embodiment, a special button may be used to determine the target sub-pixel. In this way, an error rate of the user's operation is low, thereby improving accuracy of locating.

Optionally, the above address location device may be provided with the first button, and the step of obtaining the address of the location sub-pixel which is located by the cursor of the address location device in the liquid crystal panel may include: when receiving a first operation command input through the first button, obtaining the address of the location sub-pixel which is located by the cursor of the address location device in the liquid crystal panel. At this point, the step 402 may include: in a preset time such as a first time period after receiving the first operation command, when the first operation command input through the first button is received again, calculating the address of the target sub-pixel in one pixel which the location sub-pixel belongs to, by using the sub-pixel arrangement structure of the pixel of the liquid crystal panel as well as the address of the location sub-pixel; or, when the first operation command is a command input by long pressing the first button, calculating the address of the target sub-pixel in one pixel which the location sub-pixel belongs to, by using the sub-pixel arrangement structure of the pixel of the liquid crystal panel as well as the address of the location sub-pixel. The long pressing means that the first button is pressed for a time duration which exceeds a preset time duration such as a second time period.

In one embodiment, the above preset condition may also be that in a preset time after receiving the first operation command, the first operation command input through the first button is received again, i.e., the user double clicks the above first button, or the user presses the first button twice in succession. Of course, the preset time may be preset by the user or be the default for the address location device, or the like. Alternatively, the above preset condition may also be that the first operation command is a command input by long pressing the first button. The long pressing means that the first button is pressed for a time duration which exceeds a preset time duration, i.e., exceeding one second or two seconds, which is not specifically limited.

In one embodiment, by pressing the first button twice in succession or long pressing the first button within a specific time duration, the address of the target sub-pixel may be determined. Since it is only needed to press the first button, the cost of the address location device is reduced.

Of course, in some scenarios, the above preset condition may also be that the first operation command is a command input by pressing again the above first button; or, the above preset condition may also be that an acoustic wave control command is received, or the like, which is not limited in this embodiment.

Optionally, the above step of calculating the address of the target sub-pixel in one pixel which the location sub-pixel belongs to, by using the sub-pixel arrangement structure of the pixel of the liquid crystal panel as well as the address of the location sub-pixel, may include:

determining an address of the one pixel to which the location sub-pixel belongs, by using the sub-pixel arrangement structure of the one pixel of the liquid crystal panel as well as the address of the location sub-pixel, and finding an address of the target sub-pixel in the address of the one pixel according to the sub-pixel arrangement structure of the one pixel.

Figure 6:
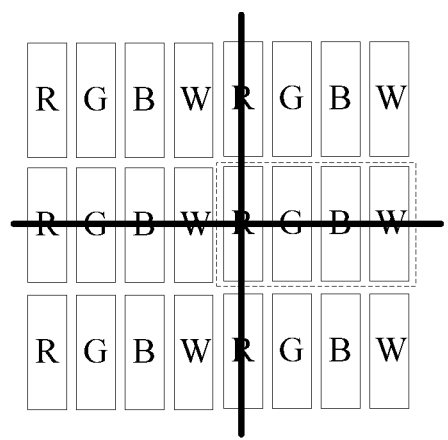
FIG. 6 is a schematic diagram showing location of a sub-pixel according to another embodiment of the present disclosure.

In one embodiment, the address of the above location sub-pixel may be a current address of the cursor, for example, which column in which row, or an X-axis value and a Y-axis value of the cursor in an X-Y coordinate system. Since there is a fixed relationship between the location sub-pixel and the one pixel to which the location sub-pixel belongs, once the address of the location sub-pixel is obtained, the address of the location sub-pixel can be used to determine the address of the one pixel to which the location sub-pixel belongs. For example, as shown in FIG. 6, one pixel includes four sub-pixels including a R sub-pixel, a G sub-pixel, a B sub-pixel and a W sub-pixel, an address of a location sub-pixel is determined by the cursor as the fifth column in the second row, and then an address of the one pixel is determined as from the fifth column to the eighth column in the second row. Then, a position of the W sub-pixel in the one pixel can be determined according to the above sub-pixel arrangement structure, and thus an address of the W sub-pixel is determined as the eighth column in the second row.

Optionally, the above step of calculating the address of the target sub-pixel in one pixel which the location sub-pixel belongs to, by using the sub-pixel arrangement structure of the pixel of the liquid crystal panel as well as the address of the location sub-pixel, may include:

calculating a position relationship between the location sub-pixel and the target sub-pixel in one pixel to which the location sub-pixel belongs by using the sub-pixel arrangement structure of the pixel of the liquid crystal panel, and determining the address of the target sub-pixel by using the position relationship and the address of the location sub-pixel.

In one embodiment, the address of the above location sub-pixel may be a current address of the cursor, for example, which column in which row, or an X-axis value and a Y-axis value of the cursor in an X-Y coordinate system. Since the sub-pixel arrangement structure of the pixel is fixed, position relationships among various sub-pixels in the pixel can be determined according to the sub-pixel arrangement structure. For example, as shown in FIG. 6, the R sub-pixel and the W sub-pixel are in an identical row, and they are separated by two sub-pixels, then, when determining that the above location sub-pixel is the R sub-pixel or determining that the above location sub-pixel is a first sub-pixel in the pixel, an address of the W sub-pixel can be determined, i.e., the address of the above target sub-pixel can be determined. The address of the location sub-pixel can be used to determine that the location sub-pixel is which sub-pixel of the pixel or what number the location sub-pixel is in the pixel, because the various pixels in the liquid crystal panel have the same structure. As an example in which four sub-pixels including RGBW sub-pixels are juxtaposed in an identical row, when the column in the address of the location sub-pixel is divided by 4 with a remainder of 1, then it can be determined that the location sub-pixel is the R sub-pixel or the first sub-pixel. When the column in the address of the location sub-pixel is divided by 4 with a remainder of 2, then it can be determined that the location sub-pixel is the G sub-pixel or the second sub-pixel. Of course, here, it only takes the target sub-pixel being the W sub-pixel as an example, when the target sub-pixel is other sub-pixel, an address of the target sub-pixel may be obtained in a similar manner.

It should be noted, the above manner for calculating the address of the target sub-pixel may also be a further limitation to the step 102 in the embodiment shown in FIG. 1.

Optionally, in one embodiment, the above target sub-pixel may be a defective sub-pixel, for example, a defective W sub-pixel or a defective Y sub-pixel. This can locate an address of the defective sub-pixel, thereby repairing the defective sub-pixel according to the located address.

In addition, in one embodiment, the above address location device may also transfer the address of the above target sub-pixel to a backend timing controller (TCON), and addresses of the RGB sub-pixels may be obtained by using existing technology and are transferred to the backend timing controller. In other words, in one embodiment, data of four sub-pixels can be directly transferred to the backend timing controller, i.e., data of RGBW sub-pixels or RGBY sub-pixels can be directly transferred to the backend timing controller. In addition, the backend timing controller may record and analyze the address transferred by the address location device.

In this embodiment, several optional implementations are added on the basis of the embodiment shown in FIG. 1, which can obtain addresses of sub-pixels which are unable to be located by the cursor in the liquid crystal panel.

Figure 7:
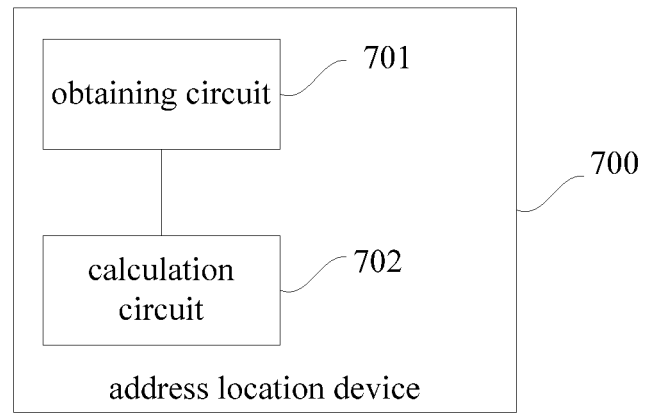
FIG. 7 is a schematic diagram of an address location device according to an embodiment of the present disclosure.

FIG. 7 is a schematic diagram of an address location device according to an embodiment of the present disclosure. Referring to FIG. 7, the address location device 700 includes:

an obtaining circuit 701 configured to obtain an address of a location sub-pixel which is located by a cursor of the address location device in a liquid crystal panel; and a calculation circuit 702 configured to calculate an address of a target sub-pixel in one pixel to which the location sub-pixel belongs, by using a sub-pixel arrangement structure of the pixel of the liquid crystal panel as well as the address of the location sub-pixel, where the target sub-pixel is one sub-pixel which is unable to be located by the cursor.

Optionally, the calculation circuit 702 is further configured to determine an address of the one pixel to which the location sub-pixel belongs, by using the sub-pixel arrangement structure of the one pixel of the liquid crystal panel as well as the address of the location sub-pixel, and find an address of the target sub-pixel in the address of the one pixel according to the sub-pixel arrangement structure of the one pixel.

Or, the calculation circuit 702 is further configured to calculate a position relationship between the location sub-pixel and the target sub-pixel in the one pixel to which the location sub-pixel belongs by using the sub-pixel arrangement structure of the one pixel of the liquid crystal panel, and determine the address of the target sub-pixel by using the position relationship and the address of the location sub-pixel.

Optionally, the calculation circuit 702 is further configured to, when the address location device meets a preset condition, calculate the address of the target sub-pixel in the one pixel to which the location sub-pixel belongs, by using the sub-pixel arrangement structure of the pixel of the liquid crystal panel as well as the address of the location sub-pixel.

Figure 8:
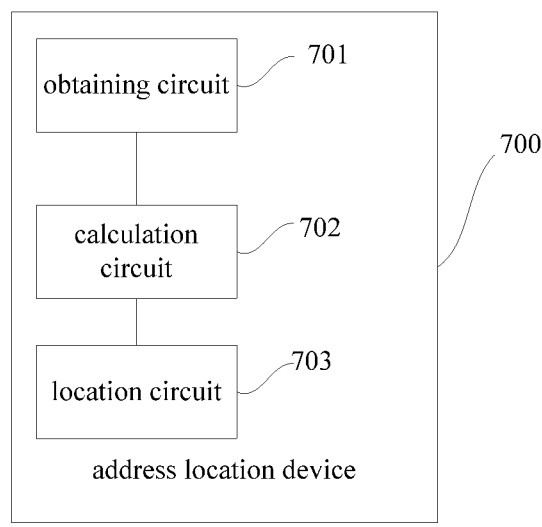
FIG. 8 is a schematic diagram of an address location device according to another embodiment of the present disclosure.

As shown in FIG. 8, the address location device 700 may further include a location circuit 703 configured to take the target sub-pixel as one sub-pixel to be located currently by the address location device, and output the address of the target sub-pixel.

Optionally, the address location device may be provided with a first button and a second button. The obtaining circuit 701 configured to, when receiving a first operation command input through the first button, obtain the address of the location sub-pixel which is located by the cursor of the address location device in the liquid crystal panel.

The calculation circuit 702 is further configured to, when receiving a second operation command input through the second button, calculate the address of the target sub-pixel in one pixel to which the location sub-pixel belongs, by using the sub-pixel arrangement structure of the pixel of the liquid crystal panel as well as the address of the location sub-pixel.

Optionally, the above address location device may be provided with one first button. The obtaining circuit 701 configured to, when receiving a first operation command input through the first button, obtain the address of the location sub-pixel which is located by the cursor of the address location device in the liquid crystal panel. At this point, the calculation circuit 702 is further configured to, in a preset time after receiving the first operation command, when the first operation command input through the first button is received again, calculate the address of the target sub-pixel in the one pixel to which the location sub-pixel belongs, by using the sub-pixel arrangement structure of the pixel of the liquid crystal panel as well as the address of the location sub-pixel; or, the calculation circuit 702 is further configured to, when the first operation command is a command input by long pressing the first button, calculate the address of the target sub-pixel in the one pixel to which the location sub-pixel belongs, by using the sub-pixel arrangement structure of the pixel of the liquid crystal panel as well as the address of the location sub-pixel. The long pressing means that the first button is pressed for a time duration which exceeds a preset time duration.

Optionally, the above target sub-pixel may be a defective sub-pixel; and/or, the target sub-pixel may be a W sub-pixel or a Y sub-pixel.

In this embodiment, the above address location device can implement various processes that are implemented by the address location device in the method embodiments shown in FIG. 1 to FIG. 6, which will not be repeated herein in order to avoid duplication. The address location device can achieve the technical effects of obtaining addresses of sub-pixels which are unable to be located by the cursor in the liquid crystal panel.

Figure 9:
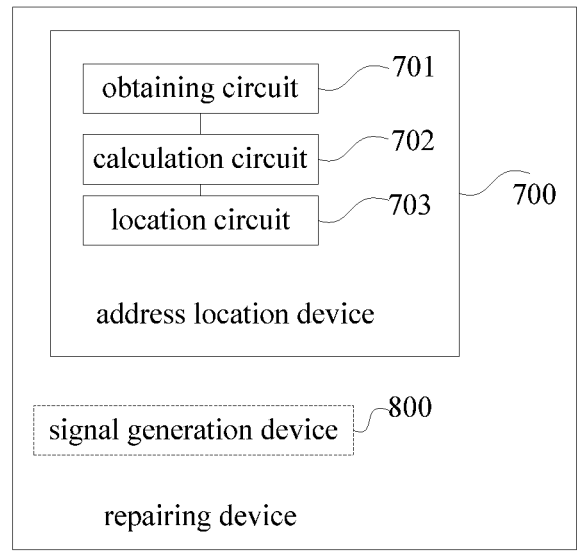
FIG. 9 is a schematic diagram of a repairing device according to an embodiment of the present disclosure.
Figure 10:
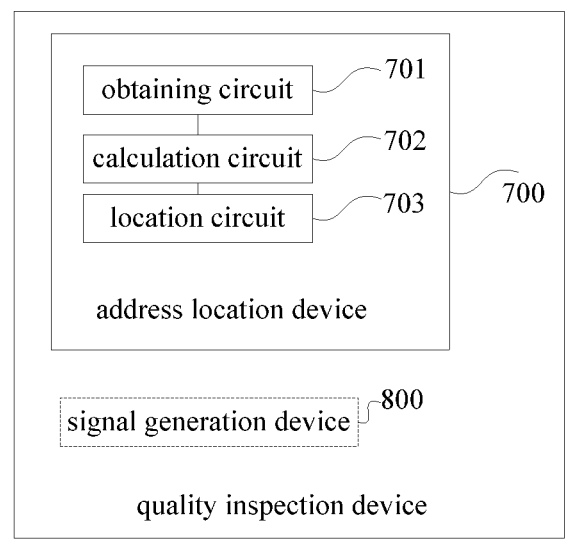
FIG. 10 is a schematic diagram of a quality inspection device according to an embodiment of the present disclosure.
Figure 11:
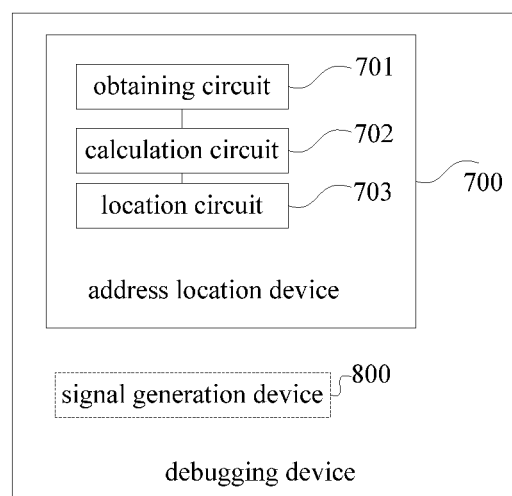
FIG. 11 is a schematic diagram of a debugging device according to an embodiment of the present disclosure.

Further, one embodiment of the present disclosure further provides a repairing device. As shown in FIG. 9, the repairing device includes the address location device according to any one of the embodiments shown in FIG. 1 to FIG. 8. The repairing device may further include a signal generation device 800 configured to output signal to a liquid crystal panel, so that the liquid crystal panels receives the signal from the signal generation device 800 and then displays pictures. Of course, embodiments of the present disclosure further provide a quality inspection device (as shown in FIG. 10) and a debugging device (as shown in FIG. 11), each of which includes the address location device according to any one of the embodiments shown in FIG. 1 to FIG. 8.

In the several embodiments provided in the present disclosure, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces; and the indirect couplings or communication connections between the devices or units may be implemented in electronic, mechanical or other forms.

In addition, functional units in the embodiments of the present disclosure may be integrated into one processing unit, or each of the units may exist alone physically, or two or more units are integrated into one unit. The integrated unit may be implemented through hardware, or may also be implemented in a form of hardware plus a software functional unit.

The integrated unit implemented in the form of software functional unit may be stored in a computer readable storage medium. The software functional unit is stored in a storage medium, and includes several instructions used to instruct a computer device (for example, a personal computer, a server, or a network device) to perform part of the steps of the methods according to the embodiments of the present disclosure. The storage medium includes: any medium that is capable of storing program codes, such as a USB flash disk, a removable hard disk, a read-only memory (Read-Only memory, ROM for short), a random access memory (Random Access Memory, RAM for short), a magnetic disk, or an optical disk.

The above are merely the optional embodiments of the present. It should be noted that, a person skilled in the art may make improvements and modifications without departing from the principle of the present disclosure, and these improvements and modifications shall also fall within the scope of the present disclosure.

What is claimed is:

1. A method for locating a sub-pixel address in a liquid crystal panel with an address location device, comprising:
    obtaining an address of a location sub-pixel of the liquid crystal panel, the location sub-pixel being located by a cursor of the address location device, and
    calculating an address of a target sub-pixel in one pixel to which the location sub-pixel belongs, by using a sub-pixel arrangement structure of the one pixel of the liquid crystal panel as well as the address of the location sub-pixel, wherein the target sub-pixel is one sub-pixel of the liquid crystal panel which is unable to be located by the cursor.

2. The method of claim 1, wherein the calculating an address of a target sub-pixel in one pixel to which the location sub-pixel belongs, by using a sub-pixel arrangement structure of the one pixel of the liquid crystal panel as well as the address of the location sub-pixel, includes:
    determining an address of the one pixel to which the location sub-pixel belongs, by using the sub-pixel arrangement structure of the one pixel of the liquid crystal panel as well as the address of the location sub-pixel, and finding the address of the target sub-pixel in the address of the one pixel according to the sub-pixel arrangement structure, or
    calculating a position relationship between the location sub-pixel and the target sub-pixel in the one pixel to which the location sub-pixel belongs by using the sub-pixel arrangement structure of the one pixel of the liquid crystal panel, and determining the address of the target sub-pixel by using the position relationship and the address of the location sub-pixel.

3. The method of claim 1, wherein the calculating an address of a target sub-pixel in one pixel to which the location sub-pixel belongs, by using a sub-pixel arrangement structure of the one pixel of the liquid crystal panel as well as the address of the location sub-pixel, includes:
when the address location device meets a preset condition, calculating the address of the target sub-pixel in the one pixel to which the location sub-pixel belongs, by using the sub-pixel arrangement structure of the one pixel of the liquid crystal panel as well as the address of the location sub-pixel, wherein the preset condition is a condition for obtaining one sub-pixel which is unable to be located by the cursor,
and wherein the method further includes:
taking the target sub-pixel as one sub-pixel to be located currently by the address location device, and outputting the address of the target sub-pixel.

4. The method of claim 3, wherein the address location device is provided with a first button and a second button, and the obtaining an address of a location sub-pixel which is located by a cursor of the address location device in a liquid crystal panel includes: when receiving a first operation command input through the first button, obtaining the address of the location sub-pixel which is located by the cursor of the address location device in the liquid crystal panel,
wherein the preset condition includes receiving a second operation command input through the second button,
wherein when the address location device meets the preset condition, the calculating the address of the target sub-pixel in the one pixel to which the location sub-pixel belongs, by using the sub-pixel arrangement structure of the pixel of the liquid crystal panel as well as the address of the location sub-pixel, includes:
in response to receiving the second operation command input through the second button, calculating the address of the target sub-pixel in the one pixel to which the location sub-pixel belongs, by using the sub-pixel arrangement structure of the one pixel of the liquid crystal panel as well as the address of the location sub-pixel.

5. The method of claim 3, wherein the address location device is provided with a first button, and the obtaining an address of a location sub-pixel which is located by a cursor of the address location device in a liquid crystal panel includes: when receiving a first operation command input through the first button, obtaining the address of the location sub-pixel which is located by the cursor of the address location device in the liquid crystal panel,
wherein the preset condition includes that another first operation command input through the first button is received again in a first time period after receiving the first operation command, or that the first operation command is a command input by long pressing the first button,
when the address location device meets the preset condition, the calculating the address of the target sub-pixel in the one pixel to which the location sub-pixel belongs, by using the sub-pixel arrangement structure of the pixel of the liquid crystal panel as well as the address of the location sub-pixel, includes:
when another first operation command input through the first button is received again in the first time period after receiving the first operation command, calculating the address of the target sub-pixel in the one pixel to which the location sub-pixel belongs, by using the sub-pixel arrangement structure of the one pixel of the liquid crystal panel as well as the address of the location sub-pixel; or,
when the first operation command is the command input by long pressing the first button, calculating the address of the target sub-pixel in the one pixel to which the location sub-pixel belongs, by using the sub-pixel arrangement structure of the one pixel of the liquid crystal panel as well as the address of the location sub-pixel, wherein the long pressing means that the first button is pressed for a time duration which exceeds a second time period.

6. The method of claim 1, wherein the target sub-pixel is a defective sub-pixel; and/or,
the target sub-pixel is a white sub-pixel or a yellow sub-pixel.

7. The method of claim 1, wherein the one sub-pixel of the liquid crystal panel which is unable to be located by the cursor, is one sub-pixel of the liquid crystal panel which the cursor is unable to be moved to.

8. The method of claim 1, wherein the target sub-pixel is a W sub-pixel or a Y sub-pixel of the liquid crystal panel which the cursor is unable to be moved to.

9. An address location device comprising:
an obtaining circuit configured to obtain an address of a location sub-pixel of a liquid crystal panel, the location sub-pixel being located by a cursor of the address location device in a liquid crystal panel, and
a calculation circuit configured to calculate an address of a target sub-pixel in one pixel to which the location sub-pixel belongs, by using a sub-pixel arrangement structure of the one pixel of the liquid crystal panel as well as the address of the location sub-pixel, wherein the target sub-pixel is one sub-pixel of the liquid crystal panel which is unable to be located by the cursor.

10. The device of claim 9, wherein:
the calculation circuit is configured to determine an address of the one pixel to which the location sub-pixel belongs, by using the sub-pixel arrangement structure of the one pixel of the liquid crystal panel as well as the address of the location sub-pixel, and find the address of the target sub-pixel in the address of the one pixel according to the sub-pixel arrangement structure, or,
the calculation circuit is configured to calculate a position relationship between the location sub-pixel and the target sub-pixel in the one pixel to which the location sub-pixel belongs by using the sub-pixel arrangement structure of the one pixel of the liquid crystal panel, and determine the address of the target sub-pixel by using the position relationship and the address of the location sub-pixel.

11. The device of claim 9, wherein the calculation circuit is further configured to, when the address location device meets a preset condition, calculate the address of the target sub-pixel in the one pixel to which the location sub-pixel belongs, by using the sub-pixel arrangement structure of the one pixel of the liquid crystal panel as well as the address of the location sub-pixel, wherein the preset condition is a condition for obtaining one sub-pixel which is unable to be located by the cursor, and
wherein the device further includes: a location circuit configured to take the target sub-pixel as one sub-pixel to be located currently by the address location device, and output the address of the target sub-pixel.

12. The device of claim 11, wherein:

the address location device is provided with a first button and a second button, the obtaining circuit is configured to, when receiving a first operation command input through the first button, obtain the address of the location sub-pixel which is located by the cursor of the address location device in the liquid crystal panel, and the calculation circuit is configured to, when receiving a second operation command input through the second button, calculate the address of the target sub-pixel in the one pixel to which the location sub-pixel belongs, by using the sub-pixel arrangement structure of the one pixel of the liquid crystal panel as well as the address of the location sub-pixel.

13. The device of claim 11, wherein the address location device is provided with a first button, the obtaining circuit is configured to, when receiving a first operation command input through the first button, obtain the address of the location sub-pixel which is located by the cursor of the address location device in the liquid crystal panel, and wherein:

the calculation circuit is further configured to, when the first operation command input through the first button is received again in a first time period after receiving the first operation command, calculate the address of the target sub-pixel in the one pixel to which the location sub-pixel belongs, by using the sub-pixel arrangement structure of the one pixel of the liquid crystal panel as well as the address of the location sub-pixel; or, the calculation circuit is further configured to, when the first operation command is a command input by long pressing the first button, calculate the address of the target sub-pixel in the one pixel to which the location sub-pixel belongs, by using the sub-pixel arrangement structure of the one pixel of the liquid crystal panel as well as the address of the location sub-pixel, wherein the long pressing means that the first button is pressed for a time duration which exceeds the second time period.

14. The device of claim 9, wherein the target sub-pixel is a defective sub-pixel; and/or, the target sub-pixel is a white sub-pixel or a yellow sub-pixel.

15. A repairing device comprising the address location device of claim 9.

16. A quality inspection device comprising the address location device of claim 9.

17. A debugging device comprising the address location device of claim 9.

18. The device of claim 9, wherein the one sub-pixel of the liquid crystal panel which is unable to be located by the cursor, is one sub-pixel of the liquid crystal panel which the cursor is unable to be moved to.

19. The device of claim 9, wherein the target sub-pixel is a W sub-pixel or a Y sub-pixel of the liquid crystal panel which the cursor is unable to be moved to.

* * * * *